UNITED STATES PATENT OFFICE.

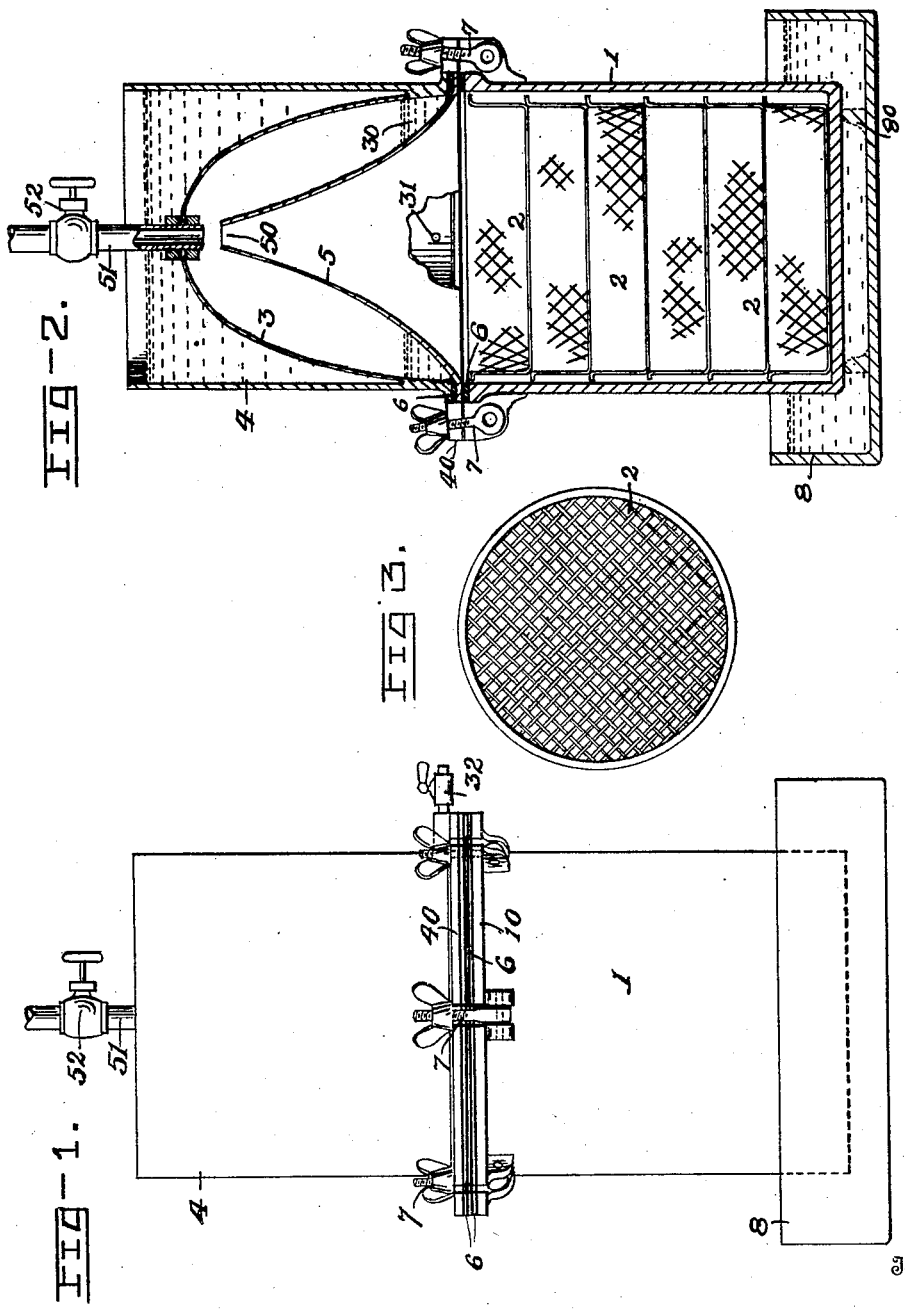

STEPHEN M. ADAMS, OF SEATTLE, WASHINGTON.

FRUIT AND VEGETABLE DRIER.

1,325,271.      Specification of Letters Patent.      Patented Dec. 16, 1919.

Application filed January 29, 1919. Serial No. 273,699.

*To all whom it may concern:*

Be it known that I, STEPHEN M. ADAMS, a citizen of the United States, and resident of the city of Seattle, county of King, and State of Washington, have invented certain new and useful Improvements in Fruit and Vegetable Driers, of which the following is a specification.

My invention relates to fruit drying or evaporating apparatus and consists of apparatus intended more particularly, for use in domestic drying of fruits and vegetables.

The object of my invention is to provide a device of a small size which is adapted for use in the home to evaporate or dry fruits and vegetables of all kinds, and one which will produce a superior product.

My invention consists of certain parts and combinations of parts which will be hereinafter described and then particularly defined by the claims terminating this specification.

In the accompanying drawings I have shown my invention embodied in a type of construction which is now preferred by me.

Figure 1 is a side elevation of the device.

Fig. 2 is a vertical section through the assembled device.

Fig. 3 is a plan view of one of the containers or trays in which the fruit or vegetable is placed before putting it into the drier.

The invention which is the subject of this patent is intended to employ a vacuum or pressures below atmospheric during the drying process, whereby the fruit may be effectively, quickly, and thoroughly dried at comparatively low temperatures. It is also the purpose of this invention to provide a device, working on these principles, which is simple in construction and which may be adapted for use in the household.

One part of this device consists of a container 1, which is in the nature of a can or kettle, having a top opening which is preferably of the full size of the can. This should be made of a material which will stand a certain amount of exhaust pressure without crushing. A vapor condensing dome is secured to the upper side of this container after the container has been filled with the fruit which is to be dried. The fruit after being prepared, is placed in trays 2, which trays are of a size to fit freely within the container 1, and of such shape that they may be stacked one upon the other until the container 1 is filled. A desirable type of construction is to make these containers of woven wire, as has been indicated in the drawings.

The vapor condensing dome consists of three principal parts, the dome proper, 3, the condensing tank 4, and the inner shell or diaphragm 5. The dome proper, is a sheet metal shell, preferably in the shape of an ellipsoidal dome 3. This dome is provided with a flange around its base, which flange matches with a corresponding flange 10, at the upper end of the container 1. Secured permanently to this is a cylindrical tank 4, which extends well above the top of the dome 3. Between these two is placed water or other cooling fluid, so that the dome acts as a condenser for the vapors which are withdrawn from the fruit.

Within the dome 3 is a member 5 herein shown, as of conical shape. The conical shape is non-essential. In its function, this is a diaphragm which closes the upper end of the container 1 and which has an upward extension to an opening 50, by which it communicates freely with the interior of the dome 3. This opening should be well above the bottom of the dome so as to provide storage space between this diaphragm and the dome for the vapors which are condensed. I have indicated at 30 a quantity of liquid which has been formed by the condensation of the vapors. This diaphragm is also provided with a flange 51 matching with the top of the container 1.

I prefer to have this diaphragm or cone 5, separate and detachable, both from the container 1 and the tank 4, so that they may be separated for cleaning when desired. I also provide means whereby the liquid formed from the condensation of the vapors may be drawn off. This may be done by providing a hole 31, which extends through both the tank and dome walls and which should be provided with a valve as 32, so that its opening may be controlled.

I provide a connection with the interior of the dome, such that the air and vapors therein may be exhausted, as by the action of a pump. This is shown as secured through the connection of a pipe 51, with the top of the dome 3, which pipe is provided with a valve 52, by which it is controlled and to which may be connected an exhaust pump.

After filling this device, the parts are assembled in the position shown in Fig. 2, using packing rings or washers 6 between the bases or the flanges, in order to secure a tight joint. These flanges are then drawn firmly together by any suitable means. The means illustrated consists of the use of eye bolts 7, which are pivotally connected with the lower member or container 1, and which enter slots in the flanges 10 and 40.

In use, after being charged, the container 1 is heated. This heat should be regulated so as to not become too high. One convenient way of doing this is to use a water bath, as is indicated in Figs. 1 and 2. This consists of any suitable pan as 8, in which is placed a low support, as lugs 80, which support the drier a slight distance above the bottom thereof. By this expedient it is assured that the temperature in the drier will not exceed a certain point, the maximum being the boiling temperature of water. It may, however, be controlled, so that it will not reach this point.

In starting the drying process, an air pump may be connected with the pipe 5 and the air contained in the drier be considerably exhausted, whereupon the valve 52 may be closed and the vapors given off by the fruit after this will pass up into the dome 3 and become condensed, by reason of the fact that the dome is kept cool through contact with water in the tank 4.

The air in the drier may be expelled in another way, as by filling the same with steam. This may be done by connection with any source of supply of steam, or by placing a small amount of water in the container and heating this until it is turned into steam. After the steam has driven the air out the valve 52 may be closed, and a very effective vacuum thus made.

It is evident that this device may be made on a larger or smaller scale and that certain parts may be varied, in construction and substituted for those described.

What I claim as my invention is:

1. A fruit and vegetable drier having a fruit receiving chamber, a vapor condensing dome securable hermetically thereto and having an inner wall provided with a vapor passage located toward the upper part of the dome, and a tank inclosing the dome.

2. A fruit and vegetable drier having a fruit receiving chamber, a vapor condensing dome, means for detachably securing the said dome and fruit receiving chamber to form a hermetic joint, a tank surrounding said dome and adapted to receive condensing water, means for discharging the vapors given off by the fruit into the condensing dome, and means for drawing off the liquid condensed in said dome.

3. A fruit and vegetable drier having a fruit receiving chamber adapted to receive fruit-containing trays, a vapor condensing dome adapted to be hermetically secured to said chamber, a diaphragm between the dome and the fruit containing chamber having a vapor discharging opening located well above the bottom of the dome, means for exhausting air from said dome and means for drawing off the liquid of condensation from the dome.

4. A fruit and vegetable drier having a fruit receiving chamber, a conical diaphragm fitting the open upper end of said chamber and having an opening in its upper part, a condensing dome fitting over the diaphragm and having an outer and an inner wall and adapted to receiving condensing water between said walls, and said dome having a condensation liquid discharge passage communicating with the lower part of the space between the dome and the diaphragm and means for hermetically securing the diaphragm and the dome above the fruit receiving chamber.

Signed at Seattle, Washington, this 23rd day of January, 1919.

STEPHEN M. ADAMS.